United States Patent
Li et al.

(10) Patent No.: US 11,542,816 B2
(45) Date of Patent: Jan. 3, 2023

(54) SYSTEM AND METHOD FOR HYDROCARBON EXPLORATION BASED ON IMAGING TUNNEL VALLEYS

(71) Applicant: SAUDI ARABIAN OIL COMPANY, Dhahran (SA)

(72) Inventors: Qiang Li, Dhahran (SA); Ammar Y. Balilah, Dhahran (SA); Abdullah A. Theyab, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 17 days.

(21) Appl. No.: 17/160,863

(22) Filed: Jan. 28, 2021

(65) Prior Publication Data
US 2022/0235652 A1    Jul. 28, 2022

(51) Int. Cl.
*E21B 49/00*    (2006.01)
*G01V 1/50*    (2006.01)
(Continued)

(52) U.S. Cl.
CPC .......... *E21B 49/00* (2013.01); *E21B 47/0025* (2020.05); *G01V 1/247* (2013.01);
(Continued)

(58) Field of Classification Search
USPC .......................................................... 702/9
See application file for complete search history.

(56) References Cited

U.S. PATENT DOCUMENTS

| 5,586,082 A | 12/1996 | Anderson et al. |
| 5,798,982 A | 8/1998 | He et al. |
| (Continued) | | |

FOREIGN PATENT DOCUMENTS

| CN | 105868482 A | 8/2016 |
| CN | 104330828 B | 1/2017 |
| (Continued) | | |

OTHER PUBLICATIONS

Kirkham, James et al., "New Insights into North Sea tunnel valley infill and genesis from high-resolution 3D seismic data", EU General Assembly 2020: EGU2020-118, May 2020, URL: <https://doi.org/10.5194/eguspere-egu2020-118> (1 page).
(Continued)

*Primary Examiner* — Paul D Lee
(74) *Attorney, Agent, or Firm* — Osha Bergman Watanabe & Burton LLP (57) ABSTRACT

A method for hydrocarbon exploration based on imaging tunnel valleys is disclosed. The method includes obtaining a 3D seismic volume data corresponding to a target formation having at least one tunnel valley, interpreting a key horizon at or above the target formation as preparation for paleo-depositional environment restoration, flattening and decimating the 3D seismic volume data using the key horizon for paleo-depositional environment restoration to obtain a conditioned 3D seismic volume data, analyzing the conditioned 3D seismic volume data for frequency content and decomposing the conditioned 3D seismic volume data into at least three attributes, blending the at least three attributes to form a single seismic volume data to illuminate key features, and displaying, on a map, a distribution of the tunnel valleys in the 3D seismic volume data of the target formation.

17 Claims, 10 Drawing Sheets

The final RGB blend slice before and after interpretation (in white dash lines).

(51) Int. Cl.
*G01V 1/24* (2006.01)
*E21B 47/002* (2012.01)

(52) U.S. Cl.
CPC ............ *G01V 1/50* (2013.01); *E21B 2200/20* (2020.05); *G01V 2200/16* (2013.01); *G01V 2210/66* (2013.01)

(56) References Cited

U.S. PATENT DOCUMENTS

| | | | |
|---|---|---|---|
| 2004/0062145 | A1 | 4/2004 | Dunn et al. |
| 2004/0148148 | A1 | 7/2004 | Butler et al. |
| 2004/0153247 | A1 | 8/2004 | Czemuszenko et al. |
| 2004/0204859 | A1* | 10/2004 | Knobloch ............... G01V 1/34 702/16 |
| 2010/0161232 | A1 | 6/2010 | Chen et al. |
| 2011/0242936 | A1* | 10/2011 | Pabon ..................... G01V 1/50 367/35 |
| 2013/0282291 | A1 | 10/2013 | Dasgupta |
| 2016/0195625 | A1* | 7/2016 | Mcardle ................ G01V 1/345 702/16 |
| 2020/0132870 | A1 | 4/2020 | Morton et al. |
| 2020/0173273 | A1* | 6/2020 | Thiruvenkatanathan ................... E21B 47/107 |

FOREIGN PATENT DOCUMENTS

| | | |
|---|---|---|
| CN | 108107469 A | 6/2018 |
| CN | 109143359 A | 1/2019 |
| CN | 109613612 A | 4/2019 |
| CN | 110361781 A | 10/2019 |
| RU | 2672766 C1 | 11/2018 |
| WO | 2019055565 A1 | 3/2019 |

OTHER PUBLICATIONS

Jørgensen, Flemming and Peter B.E. Sandersen, "Buried and open tunnel valleys in Denmark—erosion beneath multiple ice sheets", Quaternary Science Reviews, Elsevier Ltd., vol. 25, 2006, pp. 1339-1363 (25 pages).

Stucki, Mirjam Durst et al., "Subglacial tunnel valleys in the Alpine foreland: an example from Bern, Switzerland", Swiss Journal of Geosciences, Swiss Geological Society, vol. 103, Dec. 2010, pp. 363-374 (12 pages).

Sinha, Satish et al., "Spectral Decomposition of Seismic Data with Continuous Wavelet Transform", Geophysics, Society of Exploration Geophysicists, vol. 70, Issue 6, Nov. 2005, pp. 1-30 (30 pages).

"Coherence", Wikipedia, Access Date Jan. 26, 2021, URL: <https://wiki.seg.org/wiki/Coherence> (3 pages).

Halvorsen, Hanne Sundgot, "Mapping of shallow Tunnel Valleys combining 2D and 3D Seismic Data", Petroleum Geosciences, NTNU—Trondheim, May 2012 (59 pages).

Stewart, Margaret A. et al., "3D seismic analysis of buried tunnel valleys in the central North Sea: morphology, cross-cutting generations and glacial history", Quaternary Science Reviews, ScienceDirect, Elsevier Ltd., vol. 72, 2013, pp. 1-17 (17 pages).

Bataller, Francisco J. et al., "Ordovician glacial paleogeography: Integration of seismic spectral decomposition, well sedimentological data, and glacial modern analogs in the Murzuq Basin, Libya", Interpretations, Society of Exploration Geophysicists and American Association of Petroleum Geologists, vol. 7, Issue 2, May 2019, pp. T383-T408 (26 pages).

Benvenuti, Antonio and Andrea Moscariello, "High-resolution seismic geomorphology and stratigraphy of a tunnel valley confined ice-margin fan (Elsterian glaciation, Southern North Sea)", Interpretation, Society of Exploration Geophysicists and American Association of Petroleum Geologists, vol. 4, No. 4, Nov. 2016, pp. T461-T483 (23 pages).

* cited by examiner

FIG. 1

A seismic time slice through tunnel valley.

FIG. 2

A seismic attribute (variance) horizon slice through tunnel valley.

Seismic interpretation tracking, picks jump on trough doublets; snap on zero crossing.

The final RGB blend slice before and after interpretation (in white dash lines).

SYSTEM AND METHOD FOR HYDROCARBON EXPLORATION BASED ON IMAGING TUNNEL VALLEYS

BACKGROUND

Current petroleum exploration is focused on more detailed study of geological features that are subtle, yet recoverable from seismic data and existing well penetrations. Tunnel valleys are one such type of subtle geological features buried in seismic data that are potentially significant to hydrocarbon exploration.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, the invention relate to a method that includes obtaining a 3D seismic volume data corresponding to a target formation comprising at least one tunnel valley, interpreting a key horizon at or above the target formation as preparation for paleo-depositional environment restoration, flattening and decimating the 3D seismic volume data using the key horizon for paleo-depositional environment restoration to obtain a conditioned 3D seismic volume data, analyzing the conditioned 3D seismic volume data for frequency content and decomposing the conditioned 3D seismic volume data into at least three attributes, blending the at least three attributes to form a single seismic volume data to illuminate key features, and displaying, on a map, a distribution of the tunnel valleys in the 3D seismic volume data of the target formation.

In general, in one aspect, the invention relate to a system that includes a drilling system, a logging system comprising a plurality of drill bit logging tools, wherein the logging system is coupled to the drilling system, a control system coupled to a plurality of sensors, and a reservoir simulator comprising a computer processor, wherein the reservoir simulator is coupled to the logging system and the drilling system and comprises functionality for obtaining, by the computer processor, a 3D seismic volume data corresponding to a target formation comprising at least one tunnel valley, interpreting, by the computer processor, a key horizon at or above the target formation as preparation for paleo-depositional environment restoration, flattening and decimating, by the computer processor, the 3D seismic volume data using the key horizon for paleo-depositional environment restoration to obtain a conditioned 3D seismic volume data, analyzing, by the computer processor, the conditioned 3D seismic volume data for frequency content and decomposing the conditioned 3D seismic volume data into at least three attributes, blending, by the computer processor, the at least three attributes to form a single seismic volume data to illuminate key features, and displaying, on a map, a distribution of the tunnel valleys in the 3D seismic volume data of the target formation.

In general, in one aspect, the invention relate to a non-transitory computer readable medium storing instructions executable by a computer processor. The instructions comprising functionality for obtaining a 3D seismic volume data corresponding to a target formation comprising at least one tunnel valley, interpreting a key horizon at or above the target formation as preparation for paleo-depositional environment restoration, flattening and decimating the 3D seismic volume data using the key horizon for paleo-depositional environment restoration to obtain a conditioned 3D seismic volume data, analyzing the conditioned 3D seismic volume data for frequency content and decomposing the conditioned 3D seismic volume data into at least three attributes, blending the at least three attributes to form a single seismic volume data to illuminate key features, and displaying, on a map, a distribution of the tunnel valleys in the 3D seismic volume data of the target formation.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (for example, first, second, third) may be used as an adjective for an element (that is, any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for integrating well planning for a drilling program, such as to identifying tunnel valleys edges and pathways mappings. More specifically, embodiments disclosed herein may image tunnel valleys from 3D seismic volume data to confidently interpret the tunnel valleys and subsequently map their distribution to accurately drill tunnel valley targets. In particular, embodiments disclosed herein relate to providing a tool to image geological features for hydrocarbon exploration, which are not readily visible from original 3D seismic profiles and time slices.

Tunnel valleys are one such type of subtle geological feature buried in seismic data that are potentially significant to hydrocarbon exploration. A tunnel valley is a large, long, U-shaped valley originally cut under the glacial ice near the margin of continental ice. Tunnel valleys are formed by subglacial erosion by water and served as subglacial drainage pathways carrying large volumes of meltwater. However, tunnel valleys exhibit very subtle seismic characteristics in 3D seismic volume data and are often difficult to map the edges and pathways of tunnel valleys to visualize in vertical, horizontal, or computed seismic attribute data.

Figure 1:
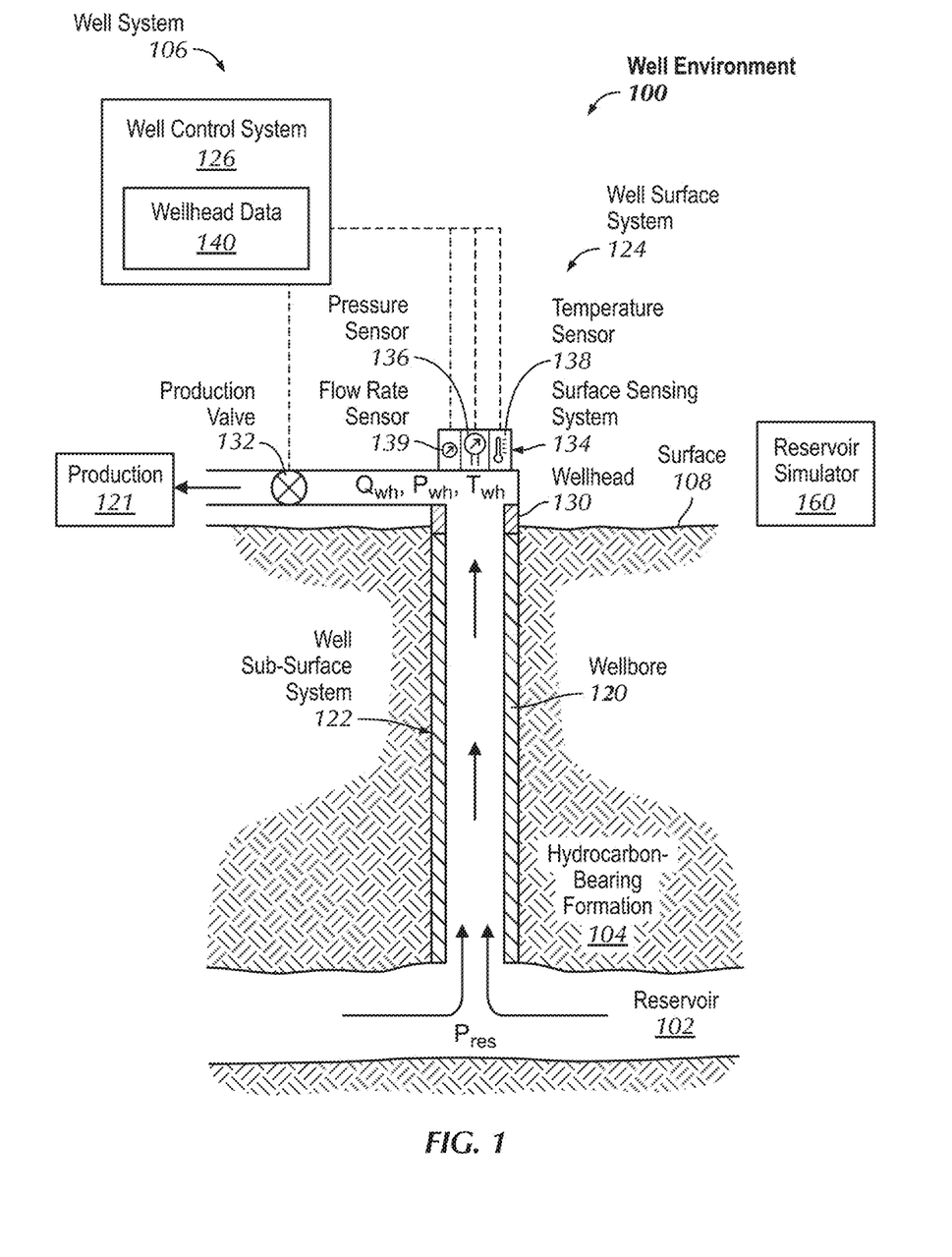
FIG. 1 shows a system in accordance with one or more embodiments.

FIG. 1 shows a schematic diagram in accordance with one or more embodiments. More specifically, FIG. 1 illustrates a well environment (100) that includes a hydrocarbon reservoir ("reservoir") (102) located in a subsurface hydrocarbon-bearing formation ("formation") (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, capillary pressure, and resistivity. In the case of the well system (106) being operated as a production well, the well system (106) may facilitate the extraction of hydrocarbons (or "production") from the reservoir (102).

In some embodiments, the well system (106) includes a wellbore (120), a well sub-surface system (122), a well surface system (124), and a well control system ("control system") (126). The control system (126) may control various operations of the well system (106), such as well production operations, well completion operations, well maintenance operations, and reservoir monitoring, assessment and development operations. In some embodiments, the control system (126) includes a computer system that is the same as or similar to that of computer system (900) described below in FIGS. 9A and 9B and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "down-hole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the control system (126) collects and records wellhead data (140) for the well system (106). The wellhead data (140) may include, for example, a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well (106), and water cut data. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well (106) to assess a relatively current state of the well system (106), and make real-time decisions regarding development of the well system (106) and the reservoir (102), such as on-demand adjustments in regulation of production flow from the well.

In some embodiments, the well sub-surface system (122) includes casing installed in the wellbore (120). For example, the wellbore (120) may have a cased portion and an uncased (or "open-hole") portion. The cased portion may include a portion of the wellbore having casing (e.g., casing pipe and casing cement) disposed therein. The uncased portion may include a portion of the wellbore not having casing disposed therein. In some embodiments, the casing includes an annular casing that lines the wall of the wellbore (120) to define a central passage that provides a conduit for the transport of tools and substances through the wellbore (120). For example, the central passage may provide a conduit for lowering logging tools into the wellbore (120), a conduit for the flow of production (121) (e.g., oil and gas) from the reservoir (102) to the surface (108), or a conduit for the flow of injection substances (e.g., water) from the surface (108) into the hydrocarbon-bearing formation (104). In some embodiments, the well sub-surface system (122) includes production tubing installed in the wellbore (120). The production tubing may provide a conduit for the transport of tools and substances through the wellbore (120). The production tubing may, for example, be disposed inside casing. In such an embodiment, the production tubing may provide a conduit for some or all of the production (121) (e.g., oil and gas) passing through the wellbore (120) and the casing.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more production valves (132) that are operable to control the flow of production (121). For example, a production valve (132) may be fully opened to enable unrestricted flow of production (121) from the wellbore (120), the production valve (132) may be partially opened to partially restrict (or "throttle") the flow of production (121) from the wellbore (120), and production valve (132) may be fully closed to fully restrict (or "block") the flow of production (121) from the wellbore (120), and through the well surface system (124).

In some embodiments, the wellhead (130) includes a choke assembly. For example, the choke assembly may include hardware with functionality for opening and closing the fluid flow through pipes in the well system (106). Likewise, the choke assembly may include a pipe manifold that may lower the pressure of fluid traversing the wellhead. As such, the choke assembly may include set of high pressure valves and at least two chokes. These chokes may be fixed or adjustable or a mix of both. Redundancy may be provided so that if one choke has to be taken out of service, the flow can be directed through another choke. In some embodiments, pressure valves and chokes are communicatively coupled to the well control system (126). Accordingly, a well control system (126) may obtain wellhead data regarding the choke assembly as well as transmit one or more commands to components within the choke assembly in order to adjust one or more choke assembly parameters.

Keeping with FIG. 1, in some embodiments, the well surface system (124) includes a surface sensing system (134). The surface sensing system (134) may include sensors for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes a surface pressure sensor (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (121) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" ($T_{wh}$). In some embodiments, the surface sensing system (134) includes a flow rate sensor (139) operable to sense the flow rate of production (121) flowing through the well surface system (124), after it exits the wellbore (120). The flow rate sensor (139) may include hardware that senses a flow rate of production (121) ($Q_{wh}$) passing through the wellhead (130).

In some embodiments, the well system (106) includes a reservoir simulator (160). For example, the reservoir simulator (160) may include hardware and/or software with functionality for generating one or more reservoir models regarding the hydrocarbon-bearing formation (104) and/or performing one or more reservoir simulations. For example, the reservoir simulator (160) may store well logs and data regarding core samples for performing simulations. A reservoir simulator may further analyze the well log data, the core sample data, seismic data, and/or other types of data to generate and/or update the one or more reservoir models. While the reservoir simulator (160) is shown at a well site, embodiments are contemplated where reservoir simulators are located away from well sites. In some embodiments, the reservoir simulator (160) may include a computer system that is similar to the computer system (900) described below with regard to FIGS. 9A and 9B and the accompanying description.

A reservoir simulator may include functionality for solving well equations and reservoir equations separately, e.g., using Additive Schwartz methods. When the number of wells in a simulation is relatively small, computation time spent solving well equations may be a small fraction of the total computation time. However, in massive full-field simulations, where hundreds or thousands of wells are being simulated, the total computation time for solving well equations may increase considerably. This may be particularly true when a multi-segment well model is used as the number of unknown well parameters to be solved may be much larger than a conventional well model. As such, reservoir simulators may assign wells to computer processes in parallel computing tasks statically and/or dynamically. For example, at the beginning of a reservoir simulation, a well may be assigned to a single computer process that performs the computations necessary for this well. In some embodiments, placement of a well within a computer process may be independent of grid partitioning, e.g., whether the well is surrounded by fine-grid grid blocks or coarsened grid blocks. During a simulation, a computer process may access both grid data for a reservoir model and well data. As such, well assignment may affect such parallel communication patterns and thereby may influence reservoir simulation performance.

In some embodiments, well assignment for parallel computer processes may include the case where a number of wells being simulated is greater than the number of computer processes involved in a reservoir simulation. Thus, multiple wells may be assigned to one computer process operating within a parallel processing stage. As wells may not need to be solved at all times during a reservoir simulation, e.g., only when the wells are producing or injecting, a situation may occur where one computer process is solving equations for multiple wells while a production well assigned to another computer process is inactive causing the computer process to be idle (i.e., waiting for the other computer processes to finish in the parallel processing stage).

Figure 2:
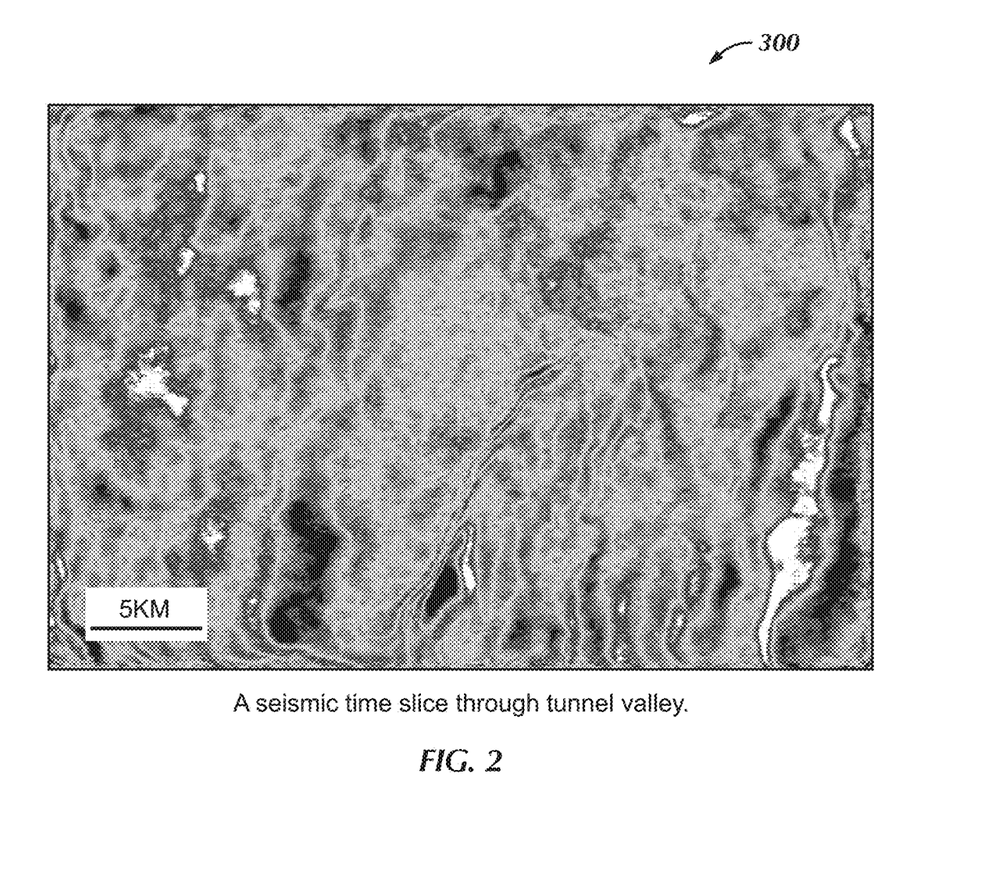
FIG. 2 shows an example in accordance with one or more embodiments.

An example of a 3D seismic time slice (300) at the level where a tunnel valley is located is shown and discussed below in FIG. 2. In the seismic time slice (300), the grayscale gradation represents seismic amplitude and horizontal/vertical axes represent longitude/latitude coordinates of a geographic area. As is seen in FIG. 2, it is not possible to identify the tunnel valleys without prior knowledge or other forms of evidence. The rock type in the FIG. 2 is mostly clastic depositions, the tunnel valley in this area is expected to have sandstone fills within the valley, and surrounded by tight shales from top, sides and bottom.

Figure 3:
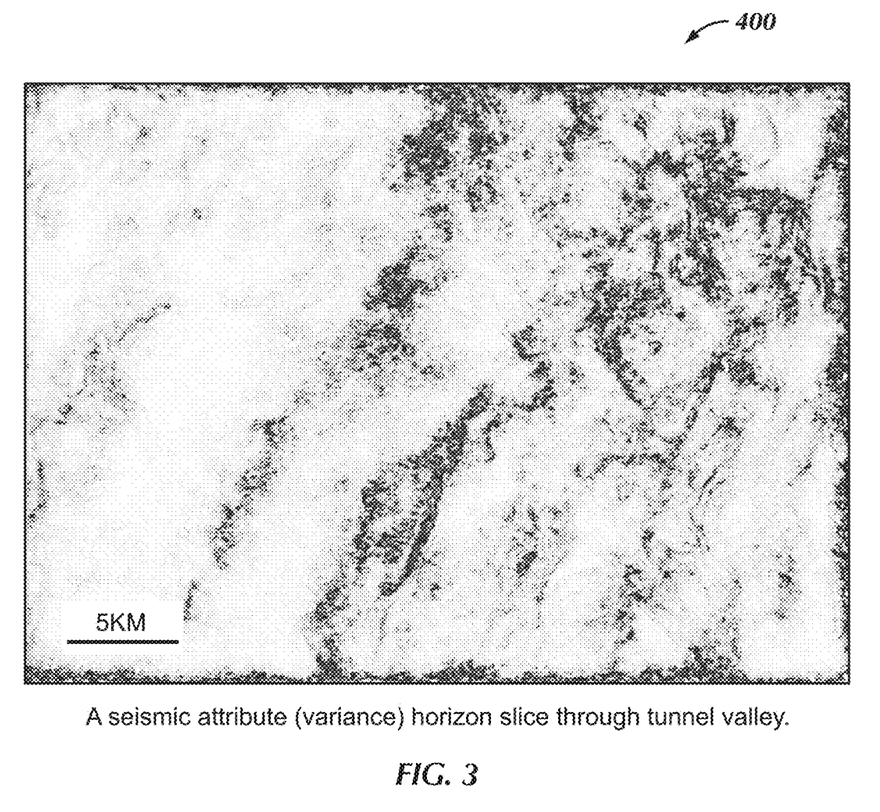
FIG. 3 shows an example in accordance with one or more embodiments.

FIG. 3, in some embodiments, shows an example of a horizon slice (400) from a seismic attribute that is commonly used to detect geological boundaries. In the horizon slice (400), the grayscale gradation represent a variance attribute over the same geographic area of FIG. 2. As shown in FIG. 3, there are faint hints of the tunnel valleys, but certainly not clear enough for confident interpretation. Many other methods have been used by exploration experts, without much success. As such, embodiments disclosed herein involve the method described and shown in the drawings, using algorithms implementing a unique workflow to image tunnel valleys, which can be applied to any generic 3D seismic volume data based on the imaging of other geological features by adjusting the attribute and frequency selection based on the rock bed thickness.

Figure 4:
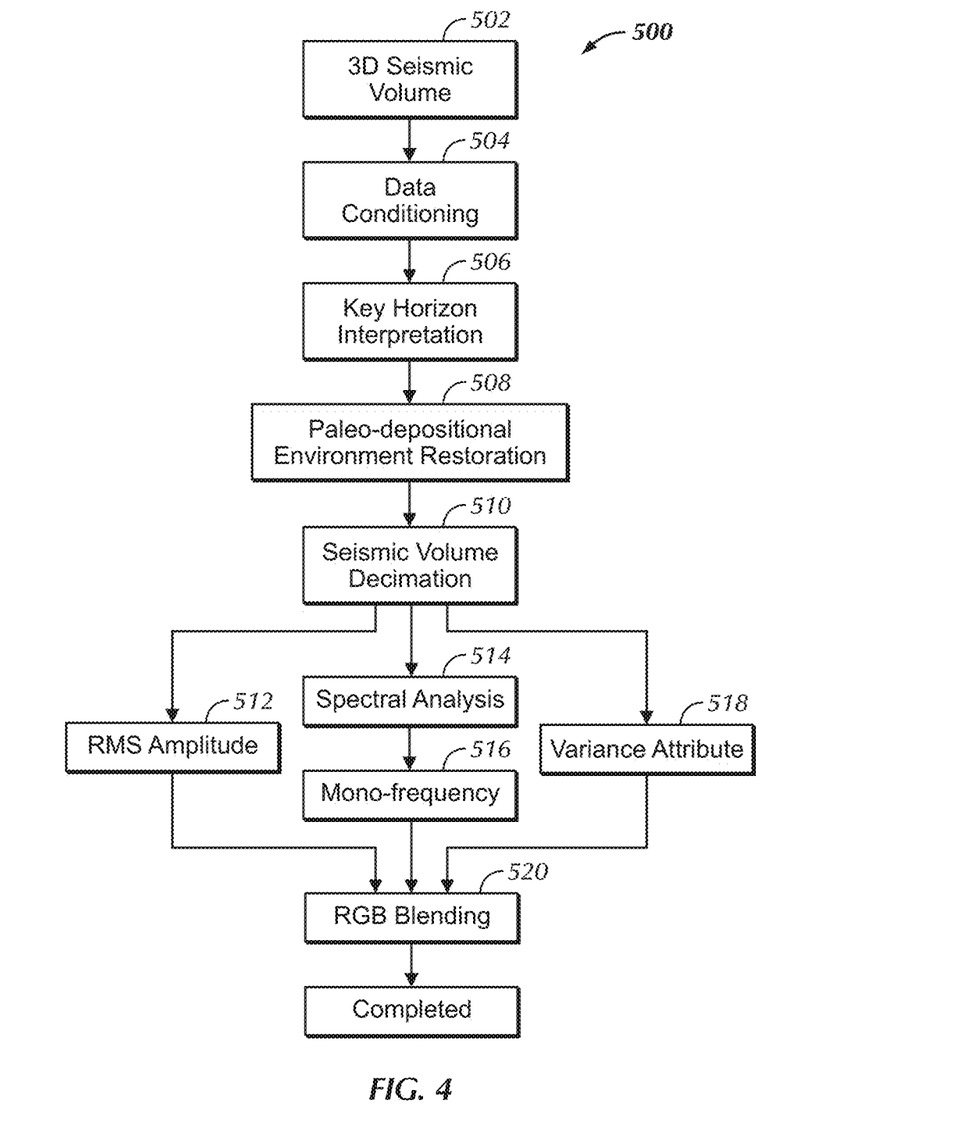
FIG. 4 shows an invention flow diagram in accordance with one or more embodiments.
Figure 9A:
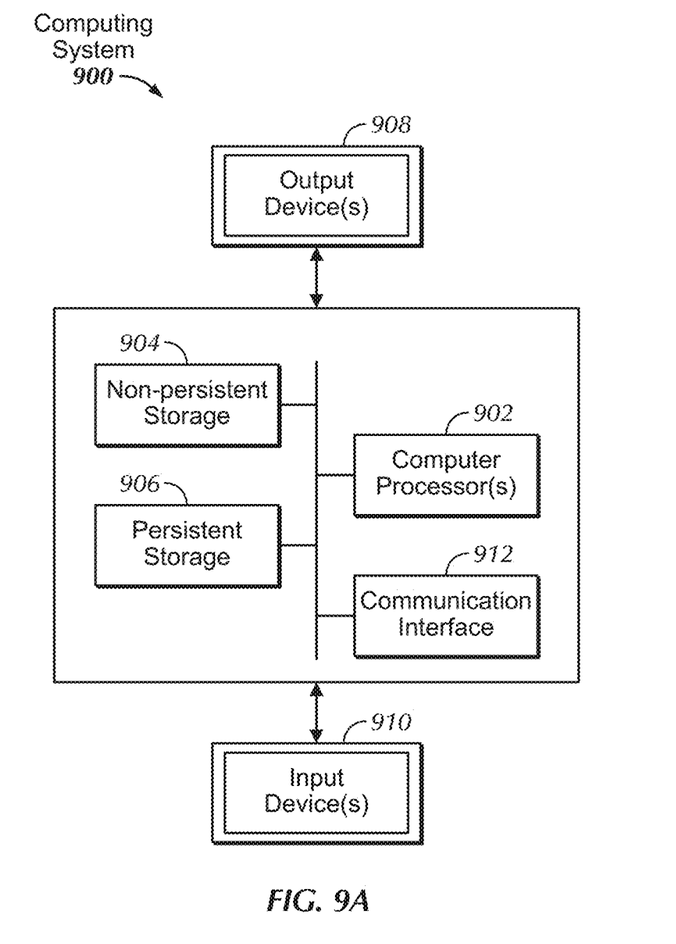
FIGS. 9A-9B shows a computing system in accordance with one or more embodiments.
Figure 9B:
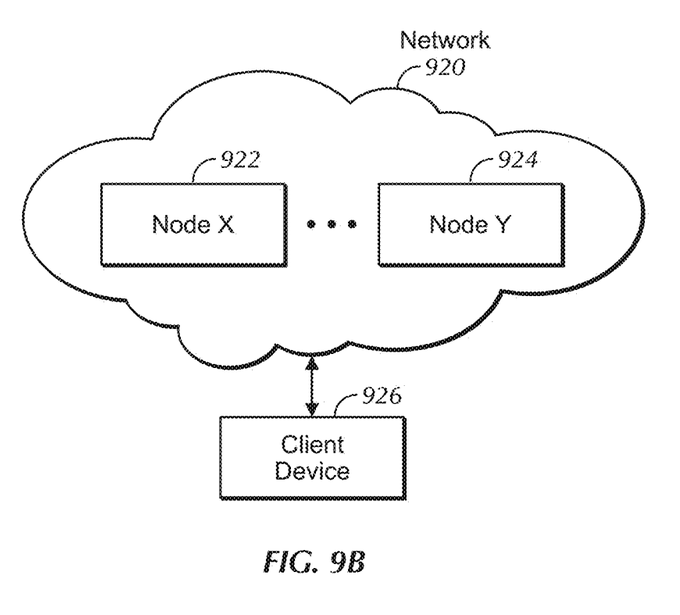

FIG. 4 shows a flow diagram of the identification of the tunnel valleys edges and pathways mapping in accordance with one or more embodiments disclosed herein. One or more blocks in FIG. 4 may be performed by a computing system, such as shown in FIGS. 9A-9B, including a computer processor and communication interface. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Data conditioning (504): In one or more embodiments, the workflow (500) starts with the conditioning of a 3D seismic volume (502). Unique parameters are used to remove random noise, yet preserve the valley edges. Many different random noise removal algorithms are known to those of ordinary skill in the art, that remove random noise, enhance seismic signal continuity, and preserve discontinuities and geological features, such as structural elements with dips. Those of ordinary skill in the art will appreciate that although the algorithm used in conditioning step 504 may operate in three dimensions, e.g., X, Y and Z directions like many others, in order to provide better continuity for seismic interpretation, the noise removal algorithm is applied only in the X and Y directions. In one or more embodiments, the Z direction parameter is not applied in order to preserve vertical seismic resolution, which entails the tunnel valley edge.

In some embodiments, the random noise removal not only improves signal-noise ratio in the time domain, it also shapes the seismic spectrum in the frequency domain to cluster closer to the dominant frequencies thus allowing more accurate spectral analysis. Because random noise manifests as high frequencies in the spectrum, this process removes the random noise, and shapes the spectrum close to dominant frequencies.

Key horizon interpretation (506): In one or more embodiments, in order to restore the paleo-depositional environment, it is necessary to interpret a key horizon at or immediately above a target formation at which tunnel valleys are being searched. The target formation is defined during the seismic well-tie process that correlates seismic horizons with petrophysical logging curves. The picked horizon must be parallel to the target formation since it will be used for paleo-topographic restoration. Any horizon that forms an angular unconformity with the target formation should be avoided.

Figure 5:
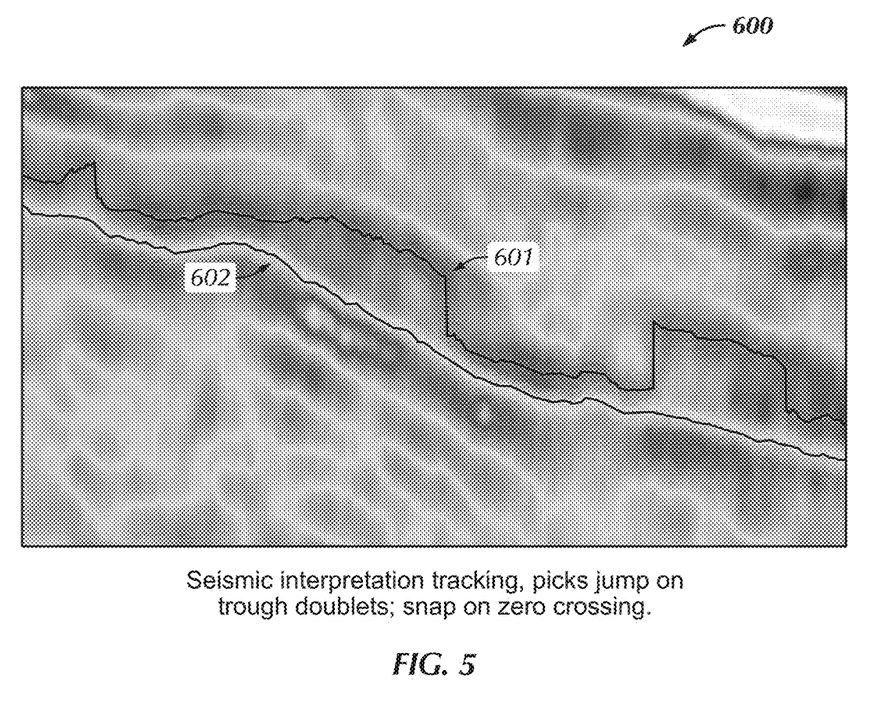
FIG. 5 shows an example in accordance with one or more embodiments.

In some embodiments, the interpretation of the key horizon is carried out using automatic 3D tracking. Typically, automated horizon picking on either peaks or troughs is liable to jump across events. A zero-crossing is therefore preferred since it limits the jumping of the picked horizons. Automated picking is preferred over manual picking to reduce user induced errors. Tracking parameters require tuning to pick a horizon reliably (a single-click may pick only a small area), so patience is needed to reliably track a whole volume. On completion picked horizons is snapped to the reflection event accurately. An accurately picked horizon is essential to this workflow. FIG. 5 shows an example of seismic interpretation differences (600) between picking a trough (601) and a zero crossing (602) where the horizontal axis represents distance, while vertical axis represents vertical travel time for seismic reflections.

Paleo-depositional environment restoration (508): Seismic data collected present day contains rich information for hydrocarbon exploration. 3D seismic volumes (502) show underground geological features after millions of years of deposition and tectonic movement. In most cases rock formations have been deformed from their originally deposited geometries. Such deformations over time obscures the original geometries of geological features that were present at the time of deposition. To inspect the ancient geological features properly, it is necessary to restore the 3D seismic volumes (502) to simulate the topographical conditions at the time of deposition. In one or more embodiments, the paleo-depositional environment restoration (508) helps to image and visualize depositional features, particularly geological features at the time of deposition. 3D seismic volumes (502) after restoration is used to extract amplitudes and different seismic attributes of geological features which have been captured in the original reflection seismic data. Flattening 3D seismic volumes (502) with a key horizon is a proven and popular way to restore the paleo-depositional environment. This method works based on the assumptions that deposition occurs in horizontal layers sequentially over time. The interpreted key horizon (506) from the previous step is used to flatten the 3D seismic volume for the paleo-depositional environment restoration (508).

In some embodiments, a surface grid is generated from the picked key horizon, preferably using a small gridding interval (typically 50 by 50 meters). Gentle smoothing of the grid (100 by 100 meters), is then run to help remove small variations. The original 3D seismic volume (502) is then flattened with the generated grid. This flattens the target formation because the picked horizon is at or above the target formation, and parallel to it.

Seismic volume decimation (510): Modern 3D seismic volume data is often huge (Giga Bytes to Tera Bytes) and may need to be down-sized if too large for the available computer resources to handle efficiently. In one or more embodiments, the 3D seismic volume (502) is cropped vertically in time (above and below the target horizon) or decimated spatially if needed. The target horizon in this embodiment is centered in a time window of 700 ms, which allows the spectrum analysis to focus on the target horizon, yet leave enough of a buffer zones to work without causing distortions close to the target horizon.

Attribute generation: (a) RMS amplitude (512): Seismic amplitudes carry abundant information from the underground formations. The tunnel valley geometry is part of the information collected and contained within seismic amplitudes. In one or more embodiments, to extract this information and enhance the edge of the tunnel valleys, root mean square (RMS) of the seismic amplitudes are calculated to be used for colors Red, Green and Blue (RGB) blending. In some embodiments, RMS amplitude computes the maximum value of the absolute value of the amplitudes. Usually this attribute is used to map the strongest direct hydrocarbon indicator within a zone of interest in the petroleum industry. The results of this step are a 3D seismic volume (502) with RMS amplitudes (512).

(b) Mono frequency (516): When seismic waves propagate through rocks, lower frequencies penetrate thicker rock beds and return reflections from them; while higher frequencies penetrate thinner beds and the returned reflections are only limited to the thin beds penetrated. Lower frequencies have the advantage of providing information from thick rock beds, but vertical resolution is reduced at low frequencies. The fact that the edges of tunnel valleys are essentially vertical, or with very large dip, makes it sensible to make use of the low frequencies without being overly concerned about the loss of vertical resolution, since there is not much to lose. Instead, reflections from thicker beds enhance the valley edge imaging since it embraces and returns reflections across a much thicker section of the tunnel valleys.

In one or more embodiments, initially, spectral analysis (514) is run to analyze the decimated seismic volume (510) near the target formation with a Fourier transform. A frequency spectrum is generated, and a dominant frequency (702) (shown in FIG. 6) is identified from the spectrum. Based on the fact that lower frequencies image the valley edge better, a single frequency is chosen for the RGB blending. As a rule of thumb, the chosen frequency is about 8 to 10 Hz below the dominate frequency (702) from the spectral analysis (514).

Figure 6:
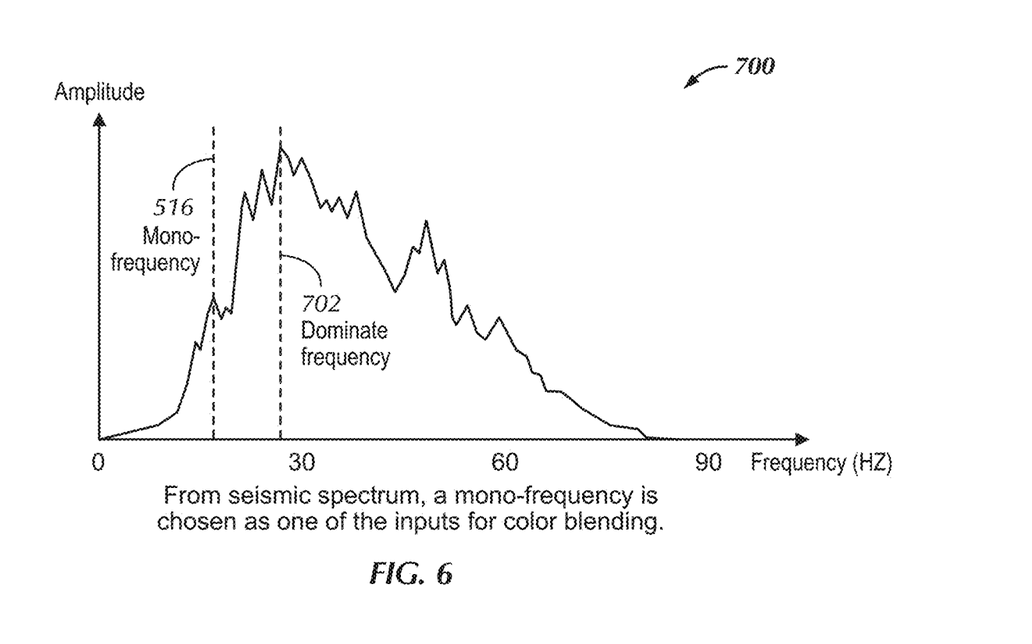
FIG. 6 shows an example in accordance with one or more embodiments.

In some embodiments, a mono-frequency (516) is obtained by band pass filtering or spectral decomposition. The frequency is selected this way because seismic signals are mostly concentrated within lower frequency range, and multiples and remaining noise usually occur at higher frequency contents. The frequency can be even lower if the seismic was acquired with broadband acquisition parameters. FIG. 6 shows an example (700) of the chosen mono-frequency (516) in relative to the dominate frequency (702) from spectral analysis (514) in accordance with one or more embodiments. It has been observed in one or more embodiments that a frequency about 10 Hz below the dominate frequency (702) helps to produce a sharp and coherent blended image.

(c) Variance attribute (518): In one or more embodiments, a variance attribute (518) is an edge detection method commonly used for faults and abrupt stratigraphic facies variations. It measures similarity between waveforms or traces. The seismic waveform is a response of the seismic wavelet convolved with the geology of the subsurface. That seismic response changes in terms of amplitude, frequency, and phase, depending on the acoustic-impedance contrast and thickness of the layers above and below the reflecting boundary. Since, acoustic impedance is affected by the lithology, porosity, density, and fluid type of the subsurface layers; then strong lateral changes in impedance contrasts give rise to strong lateral changes in waveform character. These lateral changes are what the coherency attribute measures. The results of this step are the 3D seismic volume (502) with the variance attribute (518).

RGB Blending (520): RGB blending (520) is a technique that blends three components, in one or more embodiments, RMS amplitude (512), a mono-frequency (516), and variance attribute (518), with the colors Red, Green and Blue. The technique helps to illuminate geological features that manifest themselves with the specified three attributes. The process blends three attribute volumes together, each color representing a single attribute. The resultant blended volume contains three attributes extracted from the original 3D seismic volume (502). The blended volume helps to reveal tunnel valley edges much clearer than can be seen on the original 3D seismic volume (502).

In some embodiments, the process of RGB blending is similar to a sum of reflections from top to bottom of the tunnel valleys, which results in enhancements to the valley-edge imaging. The selection of the lower frequencies is extremely important in this case.

Figure 7:
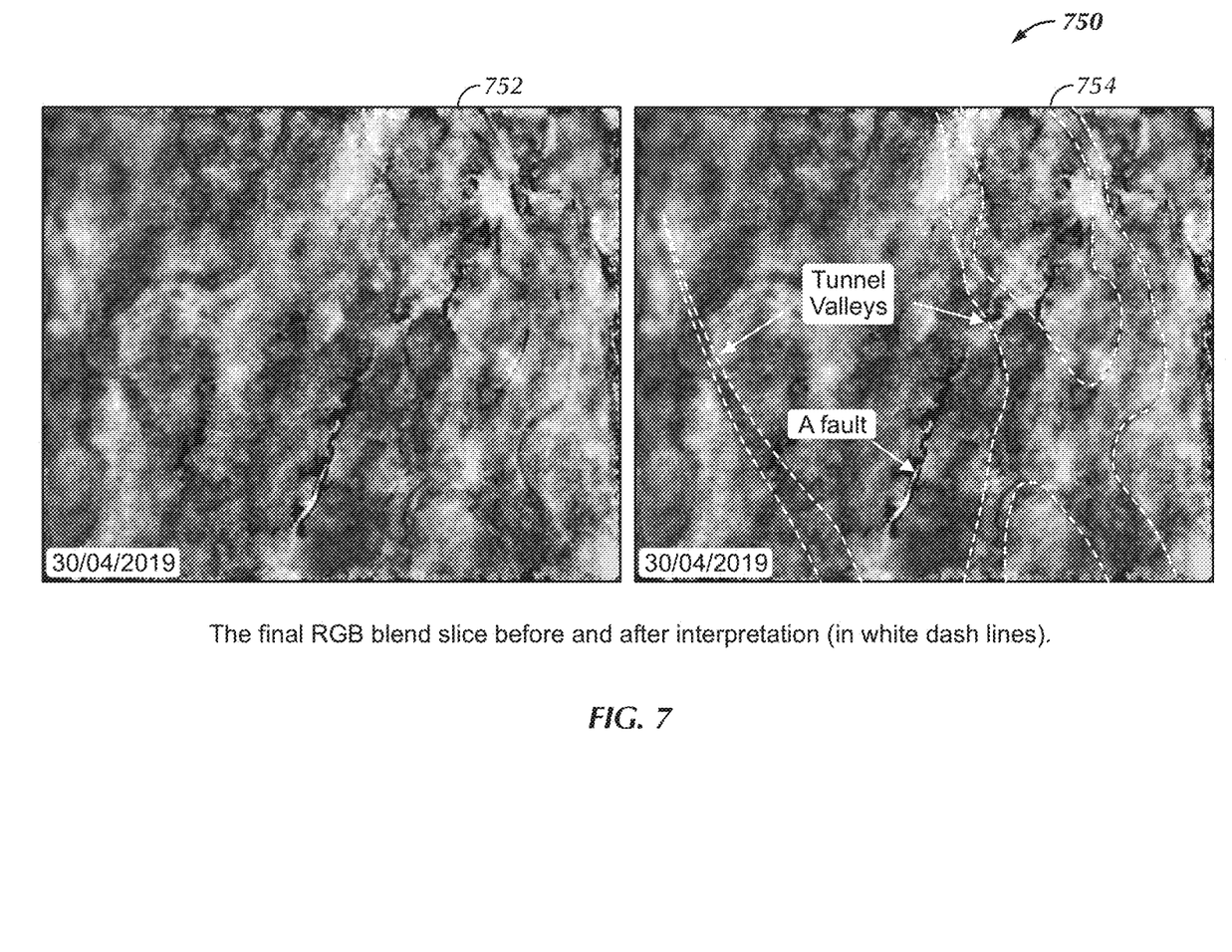
FIG. 7 shows an example in accordance with one or more embodiments.

The output from RGB blending is a single 3D seismic volume with all three attributes blended together. In one or more embodiments, different seismic slices are sliced through from top to bottom to find the slices that best imaged the tunnel valleys. FIG. 7 illustrates the seismic profile (750) with the final RGB blend slice before (752) and after interpretation (754) in accordance with one or more embodiments. The grayscale gradation represents a blended result from AMS amplitude, mono-frequency, and variance attribute. The horizontal axis and vertical axis represent longitude and latitude, respectively, of the geographic area.

Figure 8:
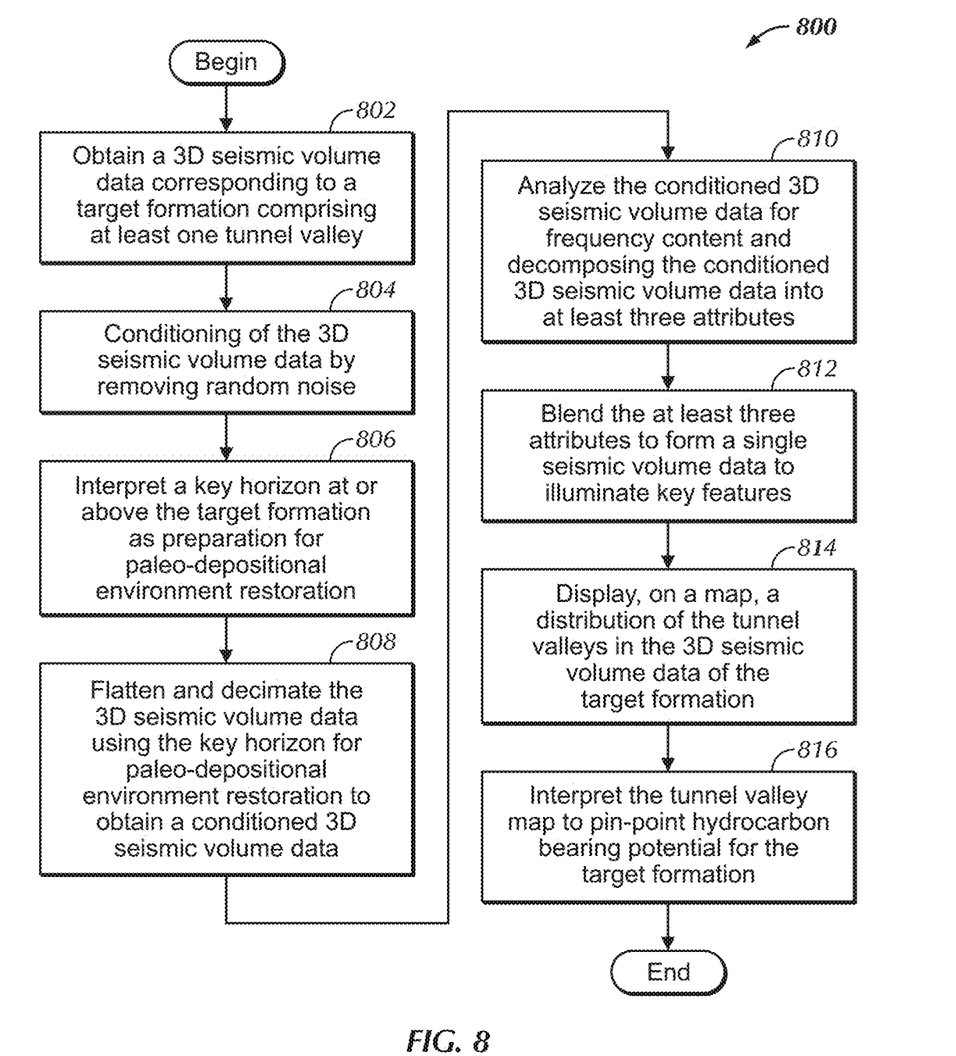
FIG. 8 shows a flowchart in accordance with one or more embodiments.

Turning to FIG. 8, FIG. 8 shows a flowchart (800) in accordance with one or more embodiments. Specifically, FIG. 8 describes a general method for imaging tunnel valleys from 3D seismic volume data to confidently interpret the tunnel valleys and subsequently map their distribution to accurately drill tunnel valley targets. One or more steps in FIG. 8 may be performed by one or more components (for example, reservoir simulator (160)) as described in FIG. 1 above. While the various steps in FIG. 8 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In step 802, a 3D seismic volume data is obtained for a subsurface region in accordance with one or more embodiments. For example, during a seismic survey, one or more seismic sources generate seismic energy (for example, a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping of the subsurface region. The processed 3D seismic volume data (502) is then examined (for example, analysis of images from the mapping) with a goal of identifying subsurface structures that may contain hydrocarbons, for example, a target formation comprising at least one tunnel valley, as explained in FIG. 4.

In step 804, the 3D seismic volume data is conditioned by removing random noise in accordance with one or more embodiments. For example, different random noise removal algorithms are used to remove random noise by data conditioning (504), yet preserving discontinuities and geological features, such as the tunnel valley edges, as explained in FIG. 4.

In step 806, a key horizon at or above the target formation is interpreted as preparation for paleo-depositional environment restoration in accordance with one or more embodiments. For example, the key horizon is interpreted (506) at or immediately above a target formation at which tunnel valleys are being searched and is carried out using automatic 3D tracking, as explained in FIG. 4.

In step 808, the 3D seismic volume data is flattened and decimated using the key horizon for paleo-depositional environment restoration to obtain a conditioned 3D seismic volume data in accordance with one or more embodiments. For example, the interpreted key horizon (506) is used to flatten the 3D seismic volume (502) to restore the paleo-depositional environment (508), which helps to image and visualize depositional features, particularly geological features at the time of deposition. In addition, the 3D seismic volume (502) is cropped vertically in time (above and below the target horizon) or decimated spatially if needed to allow the spectrum analysis to focus on the target horizon, as explained in FIG. 4.

In step 810, the conditioned 3D seismic volume data is analyzed for frequency content and the conditioned 3D seismic volume data is decomposed into at least three attributes, for example, RMS amplitude (512), a mono-frequency (516), and variance attribute (518), in accordance with one or more embodiments. For example, spectral analysis (514) is run to analyze the decimated seismic volume (510) near the target formation and a frequency spectrum is generated, and a dominant frequency (702) (shown in FIG. 6) is identified from the spectrum, as explained in FIG. 4.

In step 812, the at least three attributes are blended to form a single seismic volume data to illuminate key features in accordance with one or more embodiments. For example, the resultant blended volume contains three attributes, RMS amplitude (512), a mono-frequency (516), and variance attribute (518), extracted from the original 3D seismic volume (502), as explained in FIG. 4. The blended volume helps to reveal tunnel valley edges much clearer than can be seen on the original 3D seismic volume (502).

In step 814, a distribution of the tunnel valleys in the 3D seismic volume data of the target formation is displayed on a map in accordance with one or more embodiments. For example, different seismic slices are sliced through from top to bottom to find the slices that best imaged the tunnel valleys, as explained in FIG. 4.

In step 816, the tunnel valley map is interpreted to pin-point hydrocarbon bearing potential for the target formation in accordance with one or more embodiments. For example, the workflow (500) successfully images the edges of a potential hydrocarbon trap, as explained in FIG. 4, which can be applied to the imaging of other geological features by adjusting the attribute and frequency selection based on the rock bed thickness.

Embodiments disclosed herein provide a workflow that achieves high quality imaging of tunnel valleys where it is possible to confidently interpret the tunnel valleys, and subsequently map their distribution. This enables explorationists to accurately drill tunnel valley targets. Embodiments disclosed herein provide a powerful tool to image tunnel valleys from any generic 3D seismic data.

Embodiments may be implemented on a computing system. Any combination of mobile, desktop, server, router, switch, embedded device, or other types of hardware may be used. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities.

The computer processor(s) (902) may be an integrated circuit for processing instructions. For example, the computer processor(s) may be one or more cores or micro-cores of a processor. The computing system (900) may also include one or more input devices (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (for example, node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system shown in FIG. 9A. Further, the client device (926) may include or perform all or a portion of one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed:
1. A method comprising:
obtaining a 3D seismic volume data corresponding to a target formation comprising at least one tunnel valley;
interpreting a key horizon at or above the target formation as preparation for paleo-depositional environment restoration;

flattening and decimating the 3D seismic volume data using the key horizon for paleo-depositional environment restoration to obtain a conditioned 3D seismic volume data;

analyzing the conditioned 3D seismic volume data for frequency content and decomposing the conditioned 3D seismic volume data into at least three attributes;

blending the at least three attributes to form a single seismic volume output to illuminate key features, wherein the single seismic volume output is used to interpret and map a distribution of the at least one tunnel valley; and displaying, on a map, a distribution of the at least one tunnel valley in the 3D seismic volume data of the target formation.

2. The method of claim 1, further comprising: conditioning of the 3D seismic volume data by removing random noise.

3. The method of claim 1, further comprising interpreting the key horizon using automatic 3D tracking and generating a surface grid from the key horizon to flatten the 3D seismic volume data to restore the paleo-depositional environment.

4. The method of claim 1, further comprising blending of the three attributes with the colors Red, Green and Blue (RGB) to form a single seismic volume.

5. The method of claim 1, wherein the at least three attributes consists of root mean square (RMS) amplitude, a mono frequency and variance attribute.

6. The method of claim 1, further comprising: interpreting the tunnel valley map to pin-point hydrocarbon bearing potential for the target formation.

7. A system, comprising:
a drilling system;
a logging system comprising a plurality of drill bit logging tools, wherein the logging system is coupled to the drilling system;
a control system coupled to a plurality of sensors; and
a reservoir simulator comprising a computer processor, wherein the reservoir simulator is coupled to the logging system and the drilling system and comprises functionality for:
obtaining, by the computer processor, a 3D seismic volume data corresponding to a target formation comprising at least one tunnel valley;
interpreting, by the computer processor, a key horizon at or above the target formation as preparation for paleo-depositional environment restoration;
flattening and decimating, by the computer processor, the 3D seismic volume data using the key horizon for paleo-depositional environment restoration to obtain a conditioned 3D seismic volume data;
analyzing, by the computer processor, the conditioned 3D seismic volume data for frequency content and decomposing the conditioned 3D seismic volume data into at least three attributes;
blending, by the computer processor, the at least three attributes to form a single seismic volume output to illuminate key features, wherein the single seismic volume output is used to interpret and map a distribution of the at least one tunnel valley;
displaying, on a map, a distribution of the at least one tunnel valley in the 3D seismic volume data of the target formation.

8. The system of claim 7, wherein the reservoir simulator is configured to condition the 3D seismic volume data by removing random noise.

9. The system of claim 7, wherein the reservoir simulator is configured to: interpret the key horizon using automatic 3D tracking and generate a surface grid from the key horizon to flatten the 3D seismic volume data to restore the paleo-depositional environment.

10. The system of claim 7, wherein the reservoir simulator is configured to blend the three attributes with the colors Red, Green and Blue (RGB) to form a single seismic volume.

11. The system of claim 7, wherein the at least three attributes consists of root mean square (RMS) amplitude, a mono frequency and variance attribute.

12. The system of claim 7, wherein the reservoir simulator is configured to interpret the tunnel valley map to pin-point hydrocarbon bearing potential for the target formation.

13. A non-transitory computer readable medium storing instructions executable by a computer processor, the instructions comprising functionality for:
obtaining a 3D seismic volume data corresponding to a target formation comprising at least one tunnel valley;
interpreting a key horizon at or above the target formation as preparation for paleo-depositional environment restoration;
flattening and decimating the 3D seismic volume data using the key horizon for paleo-depositional environment restoration to obtain a conditioned 3D seismic volume data;
analyzing the conditioned 3D seismic volume data for frequency content and decomposing the conditioned 3D seismic volume data into at least three attributes;
blending the at least three attributes to form a single seismic volume output to illuminate key features, wherein the single seismic volume output is used to interpret and map a distribution of the at least one tunnel valley; and
displaying, on a map, a distribution of the at least one tunnel valley in the 3D seismic volume data of the target formation.

14. The non-transitory computer readable medium of claim 13, wherein the instructions further comprise functionality for: conditioning of the 3D seismic volume data by removing random noise.

15. The non-transitory computer readable medium of claim 13, wherein the instructions further comprise functionality for: interpreting the key horizon using automatic 3D tracking and generating a surface grid from the key horizon to flatten the 3D seismic volume data to restore the paleo-depositional environment.

16. The non-transitory computer readable medium of claim 13, wherein the instructions further comprise functionality for blending of the three attributes with the colors Red, Green and Blue (RGB) to form a single seismic volume.

17. The non-transitory computer readable medium of claim 16, wherein the single seismic volume output is used from RGB blending to interpret and map distribution of the tunnel valleys to pin-point hydrocarbon bearing potential for the target formation.

* * * * *